Inventor
William Lott Miller

Sept. 11, 1934.  W. L. MILLER  1,973,414
APPARATUS FOR DETECTING IN AND ELIMINATING FROM MATTER
FOREIGN SUBSTANCES OF HIGH MAGNETIC PERMEABILITY
Filed Sept. 2, 1930  3 Sheets-Sheet 2
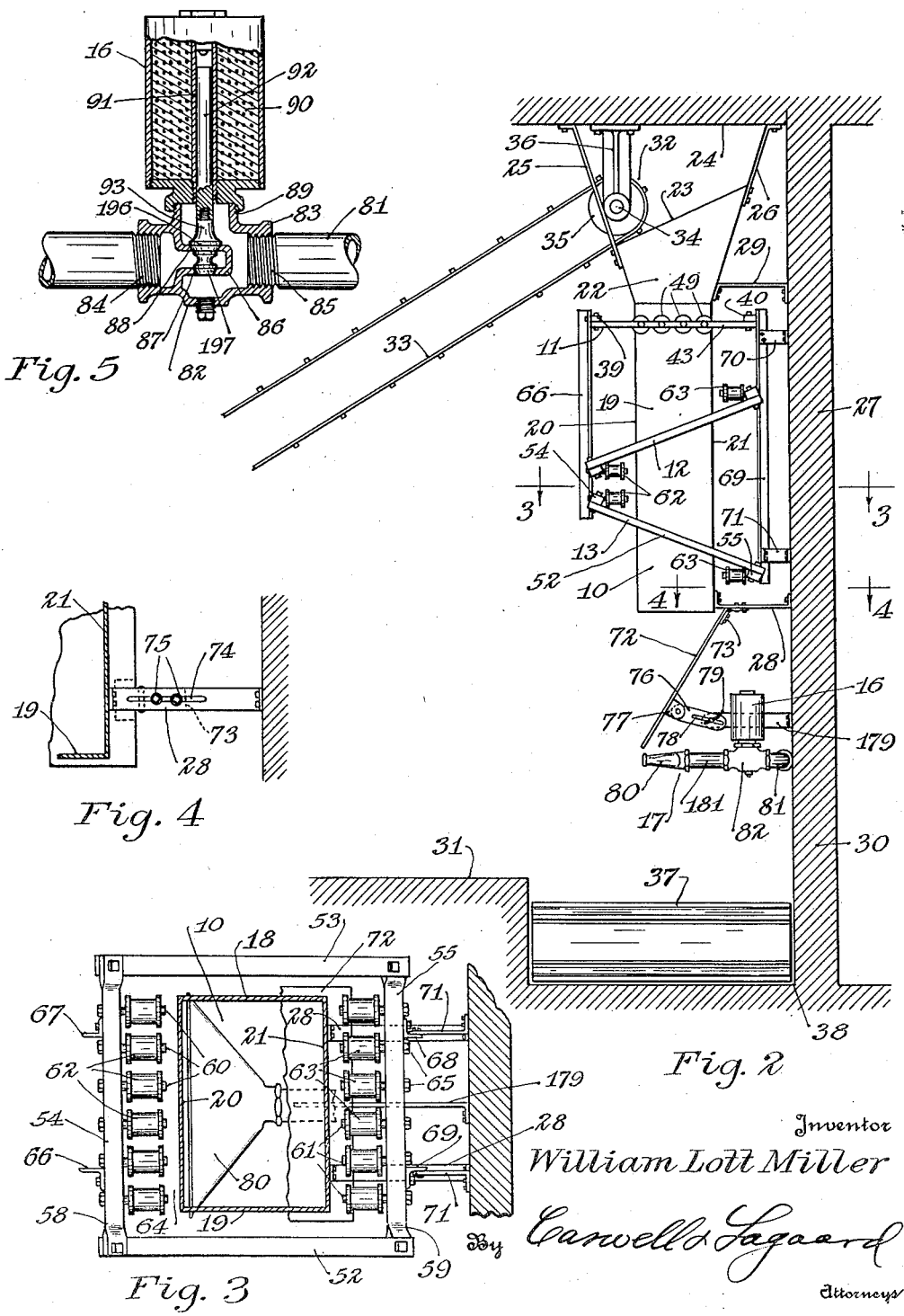

Inventor
William Lott Miller
By Cantwell & Sagaard
Attorney

Patented Sept. 11, 1934

1,973,414

UNITED STATES PATENT OFFICE 1,973,414

APPARATUS FOR DETECTING IN AND ELIMINATING FROM MATTER FOREIGN SUBSTANCES OF HIGH MAGNETIC PERMEABILITY

William Lott Miller, Winona, Minn.

Application September 2, 1930, Serial No. 479,396

13 Claims. (Cl. 209—72)

My invention relates to apparatus for detecting in and eliminating from matter, foreign substances of high magnetic permeability and has for an object to produce an apparatus of such character having a high degree of sensitivity.

A still further object of the invention resides in providing apparatus whereby the presence of foreign substances of high magnetic permeability may be readily detected in matter regardless of the inclination or position of the substance in the matter.

A feature of the invention resides in providing an apparatus having a conduit through which the matter passes and having magnetic fields through which the conduit extends, said fields being disposed with the lines of force thereof in angular relation to the direction of travel of the mass in the conduit so that the foreign substances in the matter occupy relatively different angular positions in said fields during the travel of the matter through said conduit.

An object of the invention resides in providing an electric circuit adapted to become energized upon movement of the foreign substances through said fields.

Another object of the invention resides in providing an eliminator for eliminating the portion of the mass having the foreign substances therein, said eliminator being actuated through said circuit.

A still further object of the invention resides in disposing the eliminator at a locality with respect to the course of movement of the mass of matter following that of the detector and in providing timed controlled means for retarding the operation of the eliminator until the portion of the mass having the foreign substance therein reaches the locality of said eliminator.

A feature of the invention resides in constructing the detectors with pairs of magnets and in providing pole pieces connecting like poles of said magnets, said pole pieces being spaced to form an air gap therebetween through which the mass of matter may pass.

An object of the invention resides in providing a coil associated with one of said pole pieces and adapted to provide a branch magnetic circuit through said air gap from opposite poles of said magnets.

Another object of the invention resides in disposing said coil within said circuit, said coil serving to set up an electro-motive force in said circuit when foreign substances pass through said air gap.

A still further object of the invention resides in providing an amplifier for amplifying the electro-motive force set up in said circuit.

A feature of the invention resides in providing a momentarily operated relay actuated by said amplifier.

An object of the invention resides in providing a retarded relay, said relay being actuated by said momentarily operated relay.

Another object of the invention resides in operating said eliminating device by said retarded relay.

An object of the invention resides in constructing said eliminator with a nozzle adapted to direct fluid under pressure against the mass of moving matter to eliminate a portion of the matter therefrom, and in providing a valve controlling the flow of fluid through said nozzle.

A still further object of the invention resides in operating said valve from said retarded relay.

Other objects of the invention reside in the novel combination and arrangement of parts and in the details of construction hereinafter illustrated and/or described.

In the drawings:

Fig. 2 is a side elevational view of a portion of an apparatus illustrating an embodiment of my invention.

Fig. 3 is a plan sectional view taken on line 3—3 of Fig. 2 and drawn to a larger scale.

Fig. 4 is a fragmentary plan sectional view taken on line 4—4 of Fig. 2 and drawn to a still larger scale.

Fig. 5 is a detached sectional view of the electrically operated valve used in conjunction with the invention.

Figure 1:
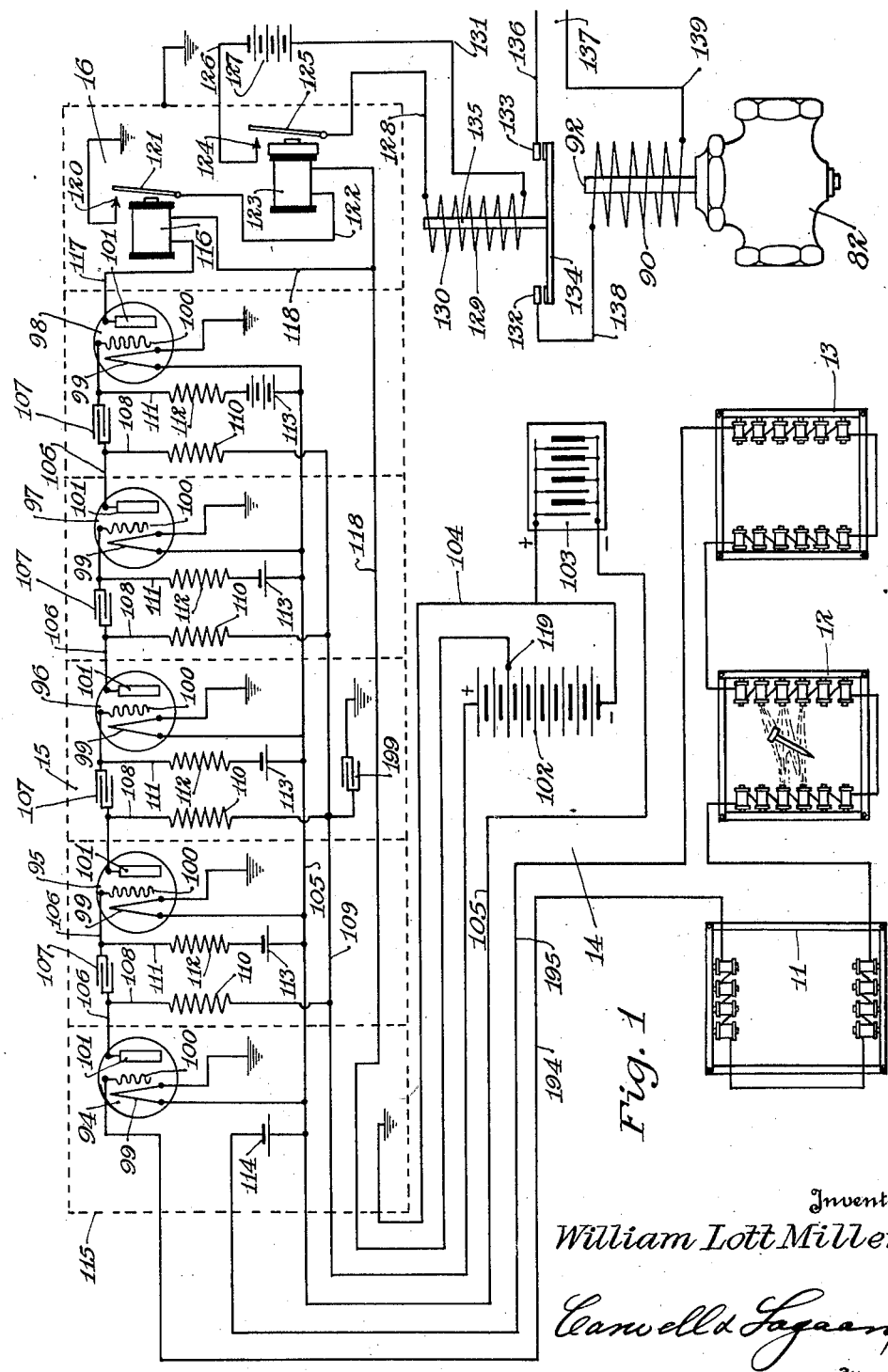
Fig. 1 is a wiring diagram of my invention.

In the manufacture of various products from different kinds of materials, it frequently becomes very important to eliminate all foreign substances, such as various metals and the like, from the material to prevent injury to various machines operating upon the same and to prevent the formation of products of inferior quality. It has been found by experience that by far the greatest percent of such injurious substances are of iron or similar substances in various forms. It has heretofore been attempted to remove the substances from the mass of the matter by passing the matter between magnets which were supposed to attract the foreign substances and retain them until the substances could be subsequently removed from the magnets. Such methods have proved highly unsuitable due to the fact that small particles of such foreign substances would not be attracted with sufficient force to be retained by the magnets and where the speed of the moving mass is appreciable, the force exerted upon the substances held by the magnets at times would be sufficient to tear the same away from the magnets. Where the matter consisted of a plastic mass or of a mass of semi-fluid characteristics, having a relatively high viscosity, the ordinary method of removing the foreign metallic substances therefrom has proved unsuitable. The present invention provides apparatus whereby the presence of substances of high magnetic permeability may be readily detected without affecting the travel or the rate of speed of the moving mass and independent of its viscosity or its consistency and in which the portion of the mass having the foreign substances therein may be bodily removed from the major portion of the mass without requiring the segregation of the foreign substances therefrom.

For the purpose of illustrating the application of my invention, I have shown a portion of a building 30 having a floor 31, a wall 27 and a ceiling 24. Within this building may be located a means for conveying the matter from which the foreign substances are to be removed and which leads to and from the apparatus constituting my invention. For this purpose, I have illustrated the discharge end 32 of an upwardly inclined belt conveyor 33 which includes a head shaft 34 having the usual pulley 35 thereon for supporting the belt of the conveyor. The shaft 34 may be journaled in hangers 36 attached to the ceiling 24. In addition to the conveyor 33, a similar conveyor 37 has been illustrated, the receiving end of which is disposed in proximity to the discharge end of the conveyor 33 and below the same. The conveyor 37 may be located in a depressed passageway 38 in the floor 31 of the building and may be constructed in any suitable manner.

My invention as best shown in Figs. 1 and 2 comprises a conduit 10 through which the matter having the foreign substances therein passes. Associated with this conduit are three detectors 11, 12 and 13 which are responsive to the passage of substances of high magnetic permeability through the conduit 10. A circuit, indicated in its entirety at 14, is connected with the detectors 11, 12 and 13. As foreign substances of high magnetic permeability pass through the conduit 10 an electro-motive force is set up in the circuit 14. The circuit 14 is connected to an amplifier indicated in its entirety at 15 which is adapted to actuate an operating mechanism indicated in Fig. 1 at 16. Immediately below the conduit 10 is an eliminator 17 which is actuated by the operating mechanism 16 and which serves to eliminate from the moving mass that portion thereof having the foreign substances to be eliminated. These parts will now be described in detail.

The conduit 10 is preferably rectangular in cross section and is constructed with side walls 18 and 19, a front wall 20 and a rear wall 21, all connected together to form a suitable duct through which the mass may pass. At the upper portion of the conduit 10 is provided a hopper 22 formed with a flared opening 23 at the upper portion thereof into which the discharge end 32 of the conveyor 33 may discharge. The hopper 22 is preferably secured to the conduit 10 and the entire structure is mounted in any suitable manner in the building where the apparatus is installed. For the purpose of illustration, the hopper 22 has been shown attached to the ceiling 24 of the building through brackets 25 and 26 while the conduit 10 is illustrated as attached to the wall 27 of the building through brackets 28. A brace 29 similar to the bracket 28 serves to hold the parts in rigid position. The conduit 10, hopper 22 and the supporting structure therefor are all constructed of brass or some other suitable metal having a relatively low magnetic permeability, the reason for which will be presently more fully brought out.

Figure 7:
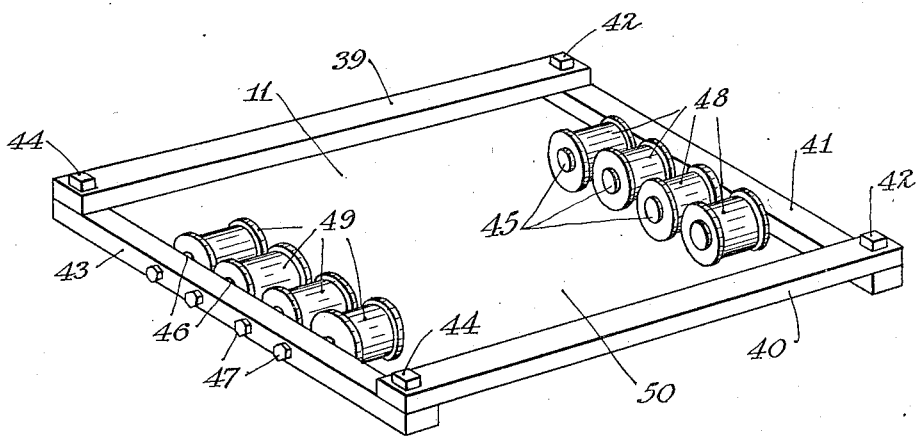

The detector 11 is illustrated in detail in Fig. 7. This detector comprises two permanent magnets 39 and 40 which are arranged in spaced relation to one another with like poles at the corresponding ends thereof. These magnets are preferably of the same strength. A bar of soft iron constituting a pole piece and indicated at 41 is connected to the two north poles of magnets 39 and 40 through bolts 42 while a similar pole piece 43 is connected to the south poles of said magnets through bolts 44. The magnets 39 and 40 may be permanent magnets if desired or the same may be electro-magnets energized by suitable coils thereon which, however, have not been shown in the drawings. Upon the inner sides of the pole pieces 41 and 43 are mounted a number of spaced parallel cores 45 and 46 which are attached to said pole pieces through screws 47 or otherwise. These cores have wound upon them coils 48 and 49 which face one another and which are spaced from one another to leave an extended air gap 50 therebetween.

The detector 11 is disposed as shown in Fig. 2 with the plane of the magnets 39 and 40 at right angles to the walls 18 and 19 of the conduit 10 and to the direction of travel of the mass of matter so that the mass of matter passing through said conduit passes through the air gap 50 and in a direction at right angles to the plane of said magnets. Due to the fact that like poles of magnets 39 and 40 have been connected together through the pole pieces 41 and 43 and due to the fact that both of these magnets are of the same magnetic strength, no magnetic flux normally flows from one magnet to the other, and no all metal magnetic circuit for flux from the one pole of each magnet to the other normally occurs, since the flux from like poles oppose each other. The magnetic flux from the poles of each of the magnets, however, passes through the air upon the exterior of these magnets in much the same manner as if the pole pieces 41 and 43 were absent. Upon the interior of said magnets the flux passes partly through said pole pieces and through the cores of the various coils as well as across the air gap 50. In this way a magnetic field is set up in the air gap 50 comprising a flux from both of the magnets 39 and 40 through which magnetic field the mass of matter operated upon must pass. When a piece of metal having a high magnetic permeability is passed through the magnetic field in the air gap 50, the same causes the flux in said air gap 50 to be diverted and to pass through said piece of metal. This reduces the reluctance of the magnetic circuit including the air gap 50 which in turn sets up an electro-motive force in the particular coils 48 and 49 whose cores 45 and 46 happen to be included within the branch magnetic circuit formed through the piece of metal. The current produced by this electro-motive force is amplified by the amplifier 15 to be presently described and the amplified current operates to eliminate the portion of the mass having the foreign substance therein as will be subsequently more fully described.

Figure 6:
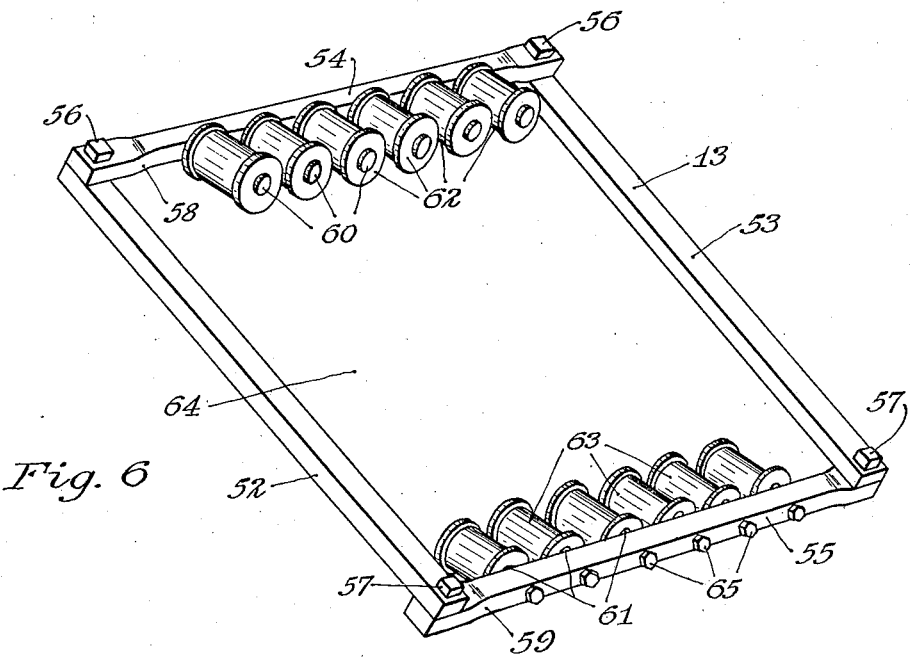
Figs. 6 and 7 are perspective views of two of the detectors used with my invention.

Inasmuch as both detectors 12 and 13 are identical in construction excepting that the one is left handed and the other right handed, only detector 13 has been separately illustrated and will be described in detail. This detector is shown in Fig. 6 and comprises two permanent magnets 52 and 53 which are considerably longer than the magnets 39 and 40. These permanent magnets have attached to corresponding poles thereof pole pieces 54 and 55 which are secured thereto through bolts 56 and 57. The pole pieces 54 and 55 are slightly twisted as indicated at 58 and 59 to cause the inner sides thereof to extend in offset parallel relation. To these pole pieces are attached through bolts 65 cores 60 and 61 similar to the cores 45 and 46 which cores have wound upon them coils 62 and 63. The construction of the detector 13 provides an air gap 64 between the magnets 52 and 53 and between the poles of the cores 60 and 61 similar to the air gap 50 in which a magnetic field set up as described in conjunction with the detector 11. In the assembling of the device, the detector 11 is placed with the poles of the cores 45 and 46 facing the end walls 18 and 19. The detector 13, however, is placed with its cores 60 and 61 facing the front and rear walls 20 and 21 of the conduit 10. The detector 12 is similarly disposed with its cores facing the front and rear walls 20 and 21. Both the detectors 12 and 13 are arranged in angular relation with respect to the direction of extent of the conduit 10 the respective angles being 45° and 135° with respect to the direction of travel of the mass of material or vice versa depending on whether the angle is measured on the right or the left of the direction of flow. By means of this arrangement the lines of force of the two fields between the cores thereof included within the air gaps of said detectors are substantially at right angles to one another and at right angles to the lines of force of the field in the air gap 50 of detector 11. In the passage of the foreign substances through the conduit 10, the position of the substance particularly where the substance has one relatively small dimension, might be such as to not appreciably reduce the reluctance of the magnetic circuit sufficiently to actuate the operating device energized by the detectors. By employing the three detectors and by arranging them so that the lines of force of their fields are at right angles to one another, the greatest dimension of the foreign substance when passing through one of said fields must lie substantially in alignment with the direction of the lines of force thereof so that the foreign substance, if not actuating all of said detectors, will positively actuate one of them. It will hence become readily apparent that the detectors will operate regardless of the form or the position of the foreign substance so that the device will operate under all conditions.

In supporting the detectors 11, 12 and 13 I employ four uprights 66, 67, 68, and 69 which are bolted to the various pole pieces 41 and 43, 54 and 55 of the detectors 11, 12 and 13. These uprights serve to hold the detectors in proper angular relation with respect to one another and with respect to the conduit 10. The various detectors and the supporting structure therefore is attached to the wall 27 of the building through a number of brackets 70 and 71 which are attached to uprights 68 and 69. In mounting the detectors with respect to the conduit 10, the poles of the various cores 45 and 46 and 60 and 61 are spaced a suitable distance from the conduit 10 so that the same do not come into actual contact therewith. In addition, the detectors 11, 12 and 13 are mounted independently of the support for said conduit so that vibrations or movement given said conduit is not transmitted to the detectors. In this manner, the detectors are free from foreign disturbances and become actuated only upon the passage of substances through said conduit having a high magnetic permeability.

The matter operated upon after passing through the conduit 10 is discharged upon a deflector plate 72 best shown in Fig. 2. This plate has attached to the upper end thereof hinges 73 which are slidably mounted in slots 74 in the brackets 28 whereby the upper end of said deflector may be moved toward or from the lower edge of the rear wall 21 of the conduit 10. The hinges 73 are slidably mounted in the slots 74 through bolts 75 which pass through said hinges and brackets and serve to clamp the hinges from movement when the proper position of the deflector 72 has been procured. The deflector 72 may swing about the hinges 73 to vary its inclination and the lower end thereof may be adjusted forwardly and rearwardly similar to the upper end through a structure best shown in Fig. 2. This structure comprises a swinging arm 76 which is pivoted to an angle 77 secured to the rear side of the said deflector. This arm is constructed with a slot 78. A bolt 79 passes through this slot and through a bracket 179 secured to the wall 27. By loosening the bolt 79, the deflector 72 may be swung about the hinge 73 in a back and forth direction and while so moving the bolt 79 slides along the slot 78. By tightening the bolt 79 the deflector 72 may be held in adjusted position.

In the normal operation of the device, the matter from which the foreign substances are to be eliminated upon being discharged from the conduit 10 drops upon the deflector 72 which retards its speed and discharges it upon the belt conveyor 37 where the same may be conveyed away from the device and to any other suitable portion of the building where it is to be further handled or fabricated. The locality of the discharge of the matter upon the belt conveyor 37 may be adjusted through the back and forth adjustment of the deflector 72 and its velocity upon leaving said deflector may also be varied through the angular adjustment of said deflector.

Immediately below the deflector 72 is situated the eliminator 17 which will now be described in detail. This eliminator comprises primarily a nozzle 80 which is mounted on a branch pipe 181 connected to a pipe line 81. This nozzle is preferably flared as shown in Fig. 3 so that the opening thereof is of the entire width of the deflector 22 which is slightly greater than the extreme width of the conduit 10. The pipe line 81 is connected to a source of some suitable fluid under pressure such as water, steam, air or the like. When this fluid is discharged through the nozzle 80, the same strikes the downwardly traveling mass of material discharged from the deflector 72 and throws the same out of its regular course and upon the floor 31. In this manner, the particular portion of the mass encountered by the stream of fluid is eliminated from the major portion thereof without affecting the speed or travel of the mass of matter. It can readily be comprehended that as long as fluid passes through the nozzle 80, the stream of matter will be deflected from the conveyor 37 and discharged upon the floor 31 where the same may be removed and disposed of in any desired manner. The branch pipe 18 to which the nozzle 80 is attached may be swung relative to the pipe line 81 to vary the position of its outlet with respect to the end of the deflector 71 so as to accurately eliminate the matter to be rejected. In ordinary use but a very small portion of the mass will be eliminated so that the same may be readily removed from the floor 31 by hand or otherwise. Where, however, an appreciable quantity of the mass is eliminated, conveying means may be employed to convey the eliminated matter to any locality desired.

Operating in conjunction with the pipe line 81, I employ an electrically operated valve 82 which is shown in detail in Fig. 5. This valve comprises a valve body 83 adapted to receive the threaded ends 84 and 85 of the sections of the branch pipe 181 in which the valve is installed. Within the valve body 83 is formed a partition structure 86 separating the inlet and outlet of the valve. This partition structure is formed with two valve seats 87 and 88. On the valve body 83 is provided a threaded neck 89 to which is attached a solenoid 90 of the plunger type provided with a hollow core 91 in which is slidably mounted a plunger 92. The plunger 92 has attached to the end thereof a valve member 93 which is constructed with two valve heads 196 and 197 adapted to seat upon the valve seats 87 and 88. By means of this construction a balanced valve is provided which is easily and effectively operated by the electro-magnets 90 when the same is energized through a suitable source of electric energy. The valve 82 is capable of handling sufficient pressure so that the desired portion of the mass of matter may be readily eliminated. If, however, greater pressure and quantity of fluid is desired to be handled than can be procured through valve 82, it can readily be comprehended that the fluid under pressure controlled by the valve 82 may be utilized for operating a larger fluid operated valve controlling the fluid discharge through nozzle 80.

The amplifier 15 may be a device employing thermionic tubes such as now well known in the radio art. The circuit 14 previously referred to comprises two leads 194 and 195 and embraces all of the coils 48, 49, 62 and 63 of the various detectors 11, 12 and 13. All of these coils are connected in series in this single circuit and the coils are wound or connected in such a manner that the electro-motive force set up by the passage of substances of high magnetic permeability through the conduit 10 are all in the same direction so that said electro-motive forces are added to one another and produce currents traveling in the same direction. The amplifier 15 comprises a number of thermionic tubes 94, 95, 96, 97 and 98 which are arranged to provide five distinct stages of amplification, the tube 94 being the input tube and the tube 98 being the output tube. These tubes are of usual construction having filaments 99, grids 100, and plates 101, all as is well known in the art. In conjunction with these tubes, a B battery 102 is employed and an A battery 103. The minus terminal of B battery 102 and the plus terminal of A battery 103 are grounded through a conductor 104. One side of the filament 99 of each of the tubes 94 to 98 is grounded while the other side of each of the filaments of said tubes is connected to a conductor 105 which is connected to the minus terminal of the A battery 103. The grid 100 of tube 94 is connected to the lead 194 of circuit 14. The various plates 101 of the tubes 94 to 97 are all connected to the grids 100 of the adjacent tubes through conductors 106, each of which includes a condenser 107. A conductor 108 is connected to the plate 101 of each of the tubes and to a lead 109 from the positive side of the B battery 102. The conductors 108 each include a resistance 110. A similar conductor 111 is connected to the grid 100 of each of the tubes and to the conductor 105 previously referred to. These conductors have connected in them resistances 112. In this manner, all of the tubes are connected to provide what is termed resistance amplification so that each stage amplifies the current delivered to it by the preceding stage in a highly effective and efficient manner. In each of the conductors 111 is also included a C battery 113. Likewise a C battery 114 is included in the lead 195 if desired. The conductor 109 may be grounded through a condenser 199. The amplifier 15 may be mounted in a suitable cabinet if desired and a shielding such as indicated diagrammatically at 115 may be employed if found necessary. Such construction, being well known in the art and forming no particular feature of the invention, has not been described in detail. Although I have illustrated an amplifier 16 consisting of a number of stages of resistance coupled amplification, it can readily be comprehended that inductance coupled, impedance coupled or transformer amplification can be employed or that the amplifier 15 may be constructed in any manner such as is now well known in the art.

The output of the output tube 98 of the amplifier 15 delivers current to a relay 116 which is preferably of a rapidly operating type. A lead 117 is connected to the plate 101 of tube 98 and a lead 118 is connected to the other side of said relay and to the plus side of the B battery 102. Inasmuch as less voltage is required in the operation of the relay 116 than is necessary with the various thermionic tubes 94 to 97, the lead 118 may be tapped into the B battery 102 as indicated at 119 instead of being connected to the lead 109. The current for operating the relay 116 is hence derived from a portion of the B battery 102 and the circuit including said relay is completed through the thermionic tube 98 upon energization of any of the coils of the various detectors 11, 12 and 13. The relay 116 is provided with a fixed contact 120 and a contactor 121 adapted to close the circuit through the contact 120. The contact 120 is ground while the contactor 121 is connected through a conductor 122 with a retarded relay 123. The other side of this relay is connected to the lead 118 so that it also derives its current from the B battery 102. The relay 123 may be of any desired type and is provided with a fixed contact 124 and a movable contactor 125 similar to that of relay 116. It is to be comprehended that any type of relay may be employed for this purpose in which the return of the movable element is retarded so that a suitable time elapses before the contact closed thereby is again opened. The fixed contact 124 is connected through a contactor 125 with one side of a battery 127 or to any other suitable source of electric energy, while another conductor 128 is connected with the contactor 125 and with the coil 129 of another relay 130. The other side of the coil 129 is connected through a conductor 131 with the other side of the battery 127. It will readily become apparent that upon actuation of relay 123, a prolonged closing of the circuit comprising leads 128, 126 and 131 results causing the operation of the relay 130 for a corresponding length of time. The relay 130 is preferably of a type capable of handling considerably more current than would be possible with either of the relays 116 or 123. This relay has been illustrated as being of the plunger type though any other type may be employed and as shown includes two fixed contacts 132 and 133 adapted to be closed through a contactor bar 134 mounted upon the plunger 135 of said relay. The relay 130 is for the purpose of energizing the electrically operated valve 82. For this purpose current may be derived from a line designated at 137. The contact 133 of relay 130 is directly connected to one side of the line 137, while the other contact 132 is connected through a conductor 138 with one end of the coil 90 of the valve 82. The other end of this coil is connected through a conductor 139 with the other side of the line 137.

The operation of the device is as follows:. The matter to be freed from foreign substances having high magnetic permeability is delivered through the conveyor 33 and into the hopper 22 where the same travels downwardly through the conduit 10 by gravity. In the event that there be any foreign substances in the matter having relatively high permeability, said substances necessarily pass through the magnetic fields set up in the air gaps 60 and 64 of the detectors 11, 12 and 13 as previously brought out. Assuming that a foreign substance within the mass is in such position as to appreciably reduce the reluctance of the magnetic circuit of detector 11, an electro-motive force would be set up in the circuit 14 which would be impressed upon the input tube of amplifier 15. The current resulting from this electro-motive force would be amplified by the amplifier and appreciable current delivered to the relay 116 through the circuit comprising conductors 117 and 118 and the plate and filament of the tube 98. As previously stated, the electro-motive force for creating this current would be provided by the B battery 102. This would immediately operate relay 116 bringing the contactor 121 into contact with the fixed contact 120 and energize the relay 123 through the circuit connected therewith. Relay 116 being a sensitive relay would, of course, only remain closed during such time as the foreign substances would be passing through the field of the particular detector in which the original electro-motive force was set up. Relay 123, however, being a retarded relay would upon actuation of relay 116 move the contactor 105 thereof into closed position and retain said contactor in such closing position for an extended length of time depending upon the natural characteristics and adjustments of said relay. During such time, the relay 130 would be actuated through the circuit comprising conductors 126, 128 and 131. This relay would hold the contactor bar 134 in closed position and energize the coil 90 of valve 82 from the line 137. As best comprehended from Fig. 5, the attracting of the plunger 92 of the valve 82 inwardly into the solenoid 90 would open valve 82 and permit the fluid under pressure to pass through the pipe line 81 and be discharged from the nozzle 80. The pressure of the fluid in the pipe line 81 is maintained sufficiently high to bodily transfer the portion of the mass of matter falling by gravity from the deflector 72 out of its course and deposit the same upon the floor 31 where the said matter may be disposed of as desired. The transferring of the matter to the floor 31 continues as long as the fluid under pressure is being discharged from the nozzle 80. This continues as long as the solenoid 90 is energized which is dependent upon the time element of the retarded relay 123. The valve 82 opens very quickly after the electro motive force has been set up in the coils of the line 14 and relay 123 is so set as to maintain said valve open a sufficient length of time to allow the matter having the foreign substances therein to travel from the detector 11 to said nozzle 80 so as to cause the portion of the matter containing said foreign substances to be eliminated from the major portion of the mass thereof. In the event that the presence of the foreign matter has not been detected by the detector 11, but by either of the detectors 12 or 13, the same amount of matter is eliminated from the moving mass as would be the case where the foreign substances were detected by the detector 11. In such case, however, the foreign substance would reach the nozzle 80 sooner than in the previous case and the elimination would continue for a short period after the foreign substance had been removed. Due to the angularity of the fields of the detectors 11, 12 and 13 with respect to one another, foreign substances of any shape will affect the operation of one of said detectors causing the elimination of the mass containing said foreign substances as previously brought out. In this manner, the device is caused to operate positively and independently of the position or formation of the foreign substance.

Although I have disclosed my method and apparatus in conjunction with the mass moving vertically, it can be readily comprehended that the mass may be moved horizontally as upon a conveyor, or the mass maintained at rest during detection and the detector moved.

The advantages of my invention are manifest. The apparatus is extremely sensitive and will indicate extremely minute particles of foreign substances of high magnetic permeability. The operation of elimination is brought about in such a manner as not to interfere with the progress of the mass of matter. The elimination is produced by eliminating not only the foreign substance but the matter in which the same is contained so that there will be no danger of the substances being lost and retained within the matter after the same has once been detected.

The apparatus may be used with matter having a high viscosity and with solid matter through which mechanical means could not be passed. The apparatus functions regardless of the position of the foreign substance or its form or location within the mass of matter.

Changes in the specific form of my invention as herein described, may be made within the scope of what is claimed without departing from the spirit of the invention.

Having described my invention, what I claim as new and desire to protect by Letters Patent is:

1. A detector for substances of high magnetic permeability comprising a frame including a pair of permanent magnets, pole pieces connecting like poles of said permanent magnets, a coil mounted upon one of said pole pieces and adapted to form a branch magnetic circuit between unlike poles of said magnets, and means for guiding the matter through said branch magnetic circuit.

2. Apparatus for detecting in matter, foreign substances of high magnetic permeability comprising means providing a magnetic field having its lines of force extending in a specified direction, means providing a second magnetic field having its lines of force extending in a direction differing from that of the lines of force of said first named magnetic field, means for guiding the matter successively through said magnetic fields, and detecting means affected by the variation of the magnetic flux through the magnetic fields of said first named means occasioned by the passage of substances of high permeability through said magnetic fields.

3. A detector for substances of high magnetic permeability comprising a frame including a pair of magnets, pole pieces connecting like poles of said magnets and spaced from one another to form an air gap therebetween, coils mounted on said pole pieces and providing branch magnetic circuits passing from one pole piece to the other and through said air gap, means for guiding the matter having the foreign substances therein through said air gap and between said coils, an electric circuit connecting said coils, and means in said electric circuit operated by the electro motive force set up in said coils in the passage of substances of high permeability through said air gap.

4. In combination with a movable mass of matter, a detector for foreign substances therein having a high magnetic permeability, said detector including a magnetic circuit having a magnetic field through which said matter passes, said detector being disposed at a certain locality with respect to the course of movement of said matter, an electric circuit, a coil included in said electric circuit and disposed with its core in said magnetic circuit, the movement of the foreign substances of high permeability passing through said magnetic field setting up an electromotive force in said coil and producing a current in said electric circuit, an amplifier for amplifying the current in said electric circuit, a circuit including a momentarily actuated relay, said circuit being operated by said amplifier, a circuit including a retarded relay, said circuit being actuated through said first named relay, and an eliminator actuated by said retarded relay and disposed at a locality in the course of movement of said substance following that of said detector, said retarded relay being timed to actuate said eliminator upon the portion of the mass having the foreign substance therein reaching said eliminator.

5. Apparatus for detecting in matter foreign substances of high magnetic permeability comprising means for guiding the matter for travel in a certain direction, means providing a magnetic field having one of its lines of force extending substantially at right angles to the direction of travel of the matter, means providing a second magnetic field having one of its lines of force extending substantially at an angle of one hundred and thirty-five degrees with the direction of travel of the matter, means providing a third magnetic field having one of its lines of force extending substantially at an angle of forty-five degrees with the direction of travel of the matter, a movable member, and means affected by the variation of the magnetic flux through the magnetic fields occasioned by the passage of substances of high permeability through said magnetic fields for moving said member.

6. Apparatus for detecting in matter, foreign substances of high magnetic permeability comprising means providing a magnetic field having a line of force, means providing a second magnetic field having a line of force, said lines of force extending at substantially right angles to one another, means providing a third magnetic field having a line of force intersecting substantially at right angles the plane containing said first and second lines of force, means for guiding the matter successively through said magnetic fields, a movable member, and means responsive to variations of magnetic flux through said fields occasioned by the passage of substances of high permeability through said fields for moving said member.

7. Apparatus for detecting in matter, foreign substances of high magnetic permeability comprising means providing a magnetic field having one of its lines of force extending in a specified direction, means providing a second magnetic field having a line of force extending in a direction such that an imaginary line intersecting said first line of force and parallel to said second line of force extends substantially at right angles to said first line of force, means providing a third magnetic field having a line of force intersecting substantially at right angles the plane containing said first line of force and said imaginary line, means for guiding matter successively through said magnetic fields, a movable member, and means responsive to variations of magnetic flux through said fields occasioned by the passage of substances of high permeability through said fields for moving said member.

8. Apparatus for detecting in matter foreign substances of high magnetic permeability comprising means for guiding the matter for travel in a certain direction, means providing a magnetic field having one of its lines of force extending substantially at right angles to the direction of travel of the matter, means providing a second magnetic field having one of its lines of force extending substantially at an angle of one hundred and thirty-five degrees with the direction of travel of the matter, means providing a third magnetic field having one of its lines of force extending substantially at an angle of forty-five degrees with the direction of travel of the matter, ejecting means for removing the portion of matter containing the foreign substance from the mass, and means affected by the variation of the magnetic flux through the magnetic fields occasioned by the passage of substances of high permeability through said magnetic fields for operating said ejecting means.

9. Apparatus for detecting in matter, foreign substances of high magnetic permeability comprising means providing a magnetic field having a line of force, means providing a second magnetic field having a line of force, said lines of force extending at substantially right angles to one another, means providing a third magnetic field having a line of force intersecting substantially at right angles the plane containing said first and second lines of force, means for guiding the matter successively through said magnetic fields, ejecting means for removing the portion of matter containing the foreign substance from the mass, and means affected by the variation of the magnetic flux through the magnetic fields occasioned by the passage of substances of high permeability through said magnetic fields for operating said ejecting means.

10. Apparatus for detecting in matter, foreign substances of high magnetic permeability comprising means providing a magnetic field having one of its lines of force extending in a specified direction, means providing a second magnetic field having a line of force extending in a direction such that an imaginary line intersecting said first line of force and parallel to said second line of force extends substantially at right angles to said first line of force, means providing a third magnetic field having a line of force intersecting substantially at right angles the plane containing said first line of force and said imaginary line, means for guiding matter successively through said magnetic fields, ejecting means for removing the portion of matter containing the foreign substance from the mass, and means affected by the variation of the magnetic flux through the magnetic fields occasioned by the passage of substances of high permeability through said magnetic fields for operating said ejecting means.

11. In apparatus for detecting in matter foreign substances of high magnetic permeability comprising means for guiding the matter for travel in a certain direction, means providing a magnetic field having one of its lines of force extending substantially at right angles to the direction of travel of the matter, means providing a second magnetic field having one of its lines of force extending substantially at an angle of one hundred and thirty-five degrees with the direction of travel of the matter, and means providing a third magnetic field having one of its lines of force extending substantially at an angle of forty-five degrees with the direction of travel of the matter.

12. In apparatus for detecting in matter, foreign substances of high magnetic permeability comprising means providing a magnetic field having a line of force, means providing a second magnetic field having a line of force, said lines of force extending at substantially right angles to one another, means providing a third magnetic field having a line of force intersecting substantially at right angles the plane containing said first and second lines of force, and means for guiding the matter successively through said magnetic fields.

13. In apparatus for detecting in matter, foreign substances of high magnetic permeability comprising means providing a magnetic field having one of its lines of force extending in a specified direction, means providing a second magnetic field having a line of force extending in a direction such that an imaginary line intersecting said first line of force and parallel to said second line of force extends substantially at right angles to said first line of force, means providing a third magnetic field having a line of force intersecting substantially at right angles the plane containing said first line of force and said imaginary line, and means for guiding matter successively through said magnetic fields.

WILLIAM LOTT MILLER.